United States Patent
Bybell et al.

(10) Patent No.: US 9,086,988 B2
(45) Date of Patent: *Jul. 21, 2015

(54) IDENTIFICATION AND CONSOLIDATION OF PAGE TABLE ENTRIES

(71) Applicant: International Business Machines Corporation, Armonk, NY (US)

(72) Inventors: Anthony J. Bybell, Chapel Hill, NC (US); Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,217

(22) Filed: Mar. 7, 2013

(65) Prior Publication Data
US 2013/0339659 A1    Dec. 19, 2013

Related U.S. Application Data

(63) Continuation of application No. 13/517,763, filed on Jun. 14, 2012.

(51) Int. Cl.
*G06F 12/00*    (2006.01)
*G06F 12/10*    (2006.01)

(52) U.S. Cl.
CPC ........ *G06F 12/1027* (2013.01); *G06F 12/1009* (2013.01); *G06F 2212/652* (2013.01)

(58) Field of Classification Search
CPC ............ G06F 12/1027; G06F 12/1009; G06F 12/145; G06F 12/08; G06F 12/0891; G06F 12/10
USPC .................................................. 711/206–208
See application file for complete search history.

(56) References Cited

U.S. PATENT DOCUMENTS 3,781,808 A    12/1973    Ahearn et al.
4,914,577 A    4/1990    Stewart et al.
(Continued)

FOREIGN PATENT DOCUMENTS

EP    0690386 A1    1/1996
JP    2002132581 A    5/2002
(Continued)

OTHER PUBLICATIONS

IBM, "Power ISA (Trademark) Version 2.06 Revision B," Jul. 23, 2010, Softcopy Distribution: http://www.power.org/resources/reading/, pp. 1-1341.

(Continued)

*Primary Examiner* — Reginald Bragdon
*Assistant Examiner* — Thanh D Vo
(74) *Attorney, Agent, or Firm* — Cantor Colburn LLP; Margaret McNamara

(57) ABSTRACT

A method for accessing memory locations includes translating, by a processor, a virtual address to locate a first page table entry (PTE) in a page table. The first PTE includes a marker and an address of a page of main storage. It is determined, by the processor, whether a marker is set in the first PTE. A large page size of a large page associated with the first PTE is identified based on determining that the marker is set in the first PTE. The large page is made up of contiguous pages of main storage. An origin address of the large page is determined based on determining that the marker is set in the first PTE. The virtual address is used to index into the large page at the origin address to access main storage.

9 Claims, 14 Drawing Sheets

(56) References Cited

U.S. PATENT DOCUMENTS

| | | | |
|---|---|---|---|
| 4,992,936 A | | 2/1991 | Katada et al. |
| 5,125,086 A | * | 6/1992 | Perazzoli, Jr. ............... 711/159 |
| 5,222,222 A | | 6/1993 | Mehring et al. |
| 5,247,634 A | * | 9/1993 | Cline et al. ............................ 1/1 |
| 5,282,274 A | * | 1/1994 | Liu ............................. 711/206 |
| 5,375,214 A | | 12/1994 | Mirza et al. |
| 5,426,750 A | | 6/1995 | Becker et al. |
| 5,454,091 A | * | 9/1995 | Sites et al. .................... 711/203 |
| 5,465,337 A | | 11/1995 | Kong |
| 5,479,627 A | | 12/1995 | Khalidi et al. |
| 5,526,504 A | | 6/1996 | Hsu et al. |
| 5,586,283 A | | 12/1996 | Lopez-Aguado et al. |
| 5,617,554 A | | 4/1997 | Alpert et al. |
| 5,765,209 A | | 6/1998 | Yetter |
| 5,774,135 A | | 6/1998 | Letham |
| 5,790,979 A | | 8/1998 | Liedtke |
| 5,802,605 A | | 9/1998 | Alpert et al. |
| 5,907,867 A | | 5/1999 | Shinbo et al. |
| 5,930,830 A | * | 7/1999 | Mendelson et al. .......... 711/171 |
| 5,946,679 A | | 8/1999 | Ahuja et al. |
| 5,956,756 A | | 9/1999 | Khalidi et al. |
| 5,963,984 A | | 10/1999 | Garibay, Jr. et al. |
| 6,185,570 B1 | | 2/2001 | Ladwig et al. |
| 6,275,912 B1 | * | 8/2001 | Haba ............................. 711/154 |
| 7,149,872 B2 | | 12/2006 | Rozas et al. |
| 7,149,982 B1 | | 12/2006 | Duperrouzel et al. |
| 7,296,139 B1 | | 11/2007 | Case et al. |
| 7,366,869 B2 | * | 4/2008 | Sartorius et al. ............. 711/207 |
| 7,389,395 B1 | * | 6/2008 | Garthwaite et al. .......... 711/165 |
| 7,412,466 B1 | * | 8/2008 | Garthwaite ............................ 1/1 |
| 7,447,869 B2 | | 11/2008 | Kruger et al. |
| 7,533,228 B1 | * | 5/2009 | Garthwaite ................... 711/159 |
| 7,562,205 B1 | | 7/2009 | Case et al. |
| 7,779,214 B2 | | 8/2010 | Stecher |
| 7,809,921 B2 | | 10/2010 | Davis |
| 7,917,725 B2 | | 3/2011 | Stecher |
| 7,975,114 B2 | * | 7/2011 | Tene et al. .................... 711/159 |
| 8,037,278 B2 | | 10/2011 | Greiner et al. |
| 8,103,851 B2 | | 1/2012 | Greiner et al. |
| 2001/0025336 A1 | | 9/2001 | Hirai et al. |
| 2004/0215918 A1 | * | 10/2004 | Jacobs et al. ................. 711/207 |
| 2005/0050295 A1 | * | 3/2005 | Noel et al. .................... 711/206 |
| 2005/0108496 A1 | * | 5/2005 | Elnozahy et al. ............. 711/203 |
| 2006/0069899 A1 | | 3/2006 | Schoinas et al. |
| 2006/0149913 A1 | * | 7/2006 | Rothman et al. ............. 711/170 |
| 2006/0149919 A1 | * | 7/2006 | Arizpe et al. ................. 711/206 |
| 2006/0212675 A1 | * | 9/2006 | Sartorius et al. ............. 711/205 |
| 2006/0253682 A1 | * | 11/2006 | Armstrong et al. ........... 711/173 |
| 2007/0079106 A1 | | 4/2007 | Davis |
| 2007/0294499 A1 | * | 12/2007 | Garthwaite ................... 711/170 |
| 2008/0052486 A1 | * | 2/2008 | Davis ............................ 711/206 |
| 2008/0104086 A1 | * | 5/2008 | Bare et al. ..................... 707/100 |
| 2008/0104358 A1 | * | 5/2008 | Noel et al. .................... 711/170 |
| 2009/0019253 A1 | | 1/2009 | Stecher et al. |
| 2009/0049320 A1 | * | 2/2009 | Dawkins et al. ............. 713/324 |
| 2009/0182964 A1 | | 7/2009 | Greiner et al. |
| 2009/0182972 A1 | | 7/2009 | Greiner et al. |
| 2010/0011187 A1 | | 1/2010 | Schoinas et al. |
| 2010/0125708 A1 | | 5/2010 | Hall et al. |
| 2011/0004739 A1 | | 1/2011 | Hohmuth et al. |
| 2011/0125983 A1 | | 5/2011 | Stecher |
| 2011/0225389 A1 | | 9/2011 | Grisenthwaite |
| 2011/0238946 A1 | | 9/2011 | Rajamony et al. |
| 2011/0276778 A1 | | 11/2011 | Dooley et al. |
| 2011/0283040 A1 | | 11/2011 | Chadha et al. |

FOREIGN PATENT DOCUMENTS

| | | |
|---|---|---|
| WO | 2006106428 A2 | 10/2006 |
| WO | 2013186645 A1 | 12/2013 |
| WO | 2013186646 A1 | 12/2013 |

OTHER PUBLICATIONS

IBM, "zArchitecture—Principles of Operation," Ninth Edition, SA22-7832-8, Aug. 2010, pp. 1-1496, http://www.ibm.com/support/documentation.

Intel, "Intel (registered) Itanium (registered) Architecture Software Developer's Manual," vol. 2: System, Architecture, Document No. 245318-005, Revision 2.2, Jan. 2006, pp. 1-654.

U.S. Appl. No. 13/517,738; Non Final Office Action; Date Filed: Jun. 14, 2012; Date Mailed: Jan. 16, 2014; pp. 1-31.

UK International Search Report and Written Opinion for International Application No. PCT/IB2013/054166, International Filing Date: May 21, 2013; Date of mailing: Aug. 27, 2013, 6 pages.

UK International Search Report and Written Opinion for Internation Application No. PCT/IB2013/054806; International Filing Date: Jun. 12, 2013; Date of Mailing: Sep. 17, 2013, 9 pages.

Barr, "Exploiting Address Space Contiguity to Accelerate TLB Miss Handling," Apr. 2010, Rice University, Entire Document, 105 pages.

Huck et al., "Architectural Support for Translation Table Management in Large Address Space Machines," May 1993, ISCA '93 Proceedings of the 20th Annual International Symposium on Computer Architecture, pp. 39-50.

Intel, "Intel (registered) Itanium (registered) Architecture Software Developer's Manual," Revision 2.3, vol. 1: Application Architecture, May 2010, 244 pages, Document No. 245317.

Liedtke, "Address Space Sparsity and Fine Granularity," ARM SIGOPS Operating Systems Review, Jan. 1995, vol. 20 Issue 1, pp. 87-90.

U.S. Appl. No. 13/517,763; Non Final Office Action; Date Filed: Jun. 14, 2012; Date Mailed: Jan. 22, 2014; pp. 1-32.

U.S. Appl. No. 13/517,758; Non Final Office Action; Date Filed: Jun. 14, 2012; Date Mailed: Jan. 31, 2014; pp. 1-34.

U.S. Appl. No. 13/785,212; Non Final Office Action; Date Filed: Mar. 5, 2013; Date Mailed: Feb. 5, 2014; pp. 1-31.

U.S. Appl. No. 13/785,188; Non Final Office Action; Date Filed: Mar. 5, 2013; Date Mailed: Feb. 6, 2014; pp. 1-29.

Peng, et al. The PowerPC Architecture[TM]: 64-Bit Power with 32-Bit Compatibility, 1995, COMPCON—IEEE—Digest of Papers and Proceedings, pp. 300-308.

Szmajda et al., "Variable Radix Page Table: A Page Table for Modern Architectures," 2003, Advances in Computer Systems Architecture Lecture Notes in Computer Science vol. 2823, pp. 290-304.

T. W. Barr et al., "Translation Caching: Skip, Don't Walk (the page Table)," ISCA '10, Jun. 19-23, 2010, Saint Malo, France, Copyright 2010 ACM, Jul. 10, 2006, 12 pages.

\* cited by examiner

| PTE #0-511 | VIRTUAL ADDRESS | PHYSICAL ADDRESS | VALID | MARKER |
|---|---|---|---|---|
| 0 | 000000 | 1234567800008000 | 1 | |
| 1 | 001000 | 1234567800009000 | 1 | |
| 2 | 002000 | 123456780000A000 | 1 | |
| 3 | 003000 | ? | 0 | |
| ... | | | | |
| 511 | 1ff000 | | | |

FIG. 5A

| PTE #0-511 | VIRTUAL ADDRESS | PHYSICAL ADDRESS | VALID | MARKER |
|---|---|---|---|---|
| 0 | 000000 | 1234567800008000 | 1 | * |
| 1 | 001000 | 1234567800009000 | 1 | * |
| 2 | 002000 | 123456780000A000 | 1 | * |
| 3 | 003000 | 123456780000B000 | 1 | * |
| ... | | | | |
| 511 | 1ff000 | | | |

FIG. 5B

| PTE #0-511 | PHYSICAL ADDRESS | VALID | MARKER |
|---|---|---|---|
| 0 | 1234567800008000 | 1 | * |
| 1 | 1234567800009000 | 1 | * |
| 2 | 123456780000A000 | 1 | * |
| 3 | 123456780000B000 | 1 | * |
| ... | | | |
| 511 | | | |

FIG. 5C

| PTE #0-511 | VIRTUAL ADDRESS | PHYSICAL ADDRESS | VALID | MARKER | REMAINING FUNCTION BITS |
|---|---|---|---|---|---|
| 0 | 000000 | 1234567800008000 | 1 | | |
| 1 | 001000 | ################ | 1 | * | ################ |
| 2 | 002000 | 1234567800000A000 | 1 | * | |
| 3 | 003000 | 1234567800000B000 | 1 | | |
| ... | | | | | |
| 511 | 1ff000 | | | | |

IDENTIFICATION AND CONSOLIDATION OF PAGE TABLE ENTRIES

CROSS-REFERENCE TO RELATED APPLICATION

This application is a continuation of U.S. patent application Ser. No. 13/517,763, filed Jun. 14, 2012, the disclosure of which is incorporated by reference herein in its entirety.

BACKGROUND

The present invention relates to managing memory page tables in a processing system, and more specifically, to joining page table entries in a processing system.

Processors including central processing units (CPUs) may use translation lookaside buffers (TLB) as caches that improve virtual address translation speed. The TLBs are used to map virtual and physical addresses spaces and includes page table entries that map the virtual addresses to the physical addresses.

Several address translation mechanisms are used in computer systems. In PowerPC® by IBM, for example, an effective address is translated to a corresponding real address by way of page table entries found by selecting an ESID table entries associated with the effective address, and using the entry to locate a group of page table entry by way of a hashing algorithm. In zArchitecture®, also by IBM, for another example, an effective address is translated to a corresponding real address by way of a hierarchy of translation tables, translation tables are indexed by a portion of the effective address to find the address of the next translation table of the hierarchy until a real (or absolute) address is obtained. Thus, the PowerPC address translation maps a 64 bit effective address (of a large range of memory ($2^{64}$ bytes)) in only 2 levels (an SLB table entry and page table entry), while zArchitecture hierarchical address translation requires 5 tables to translate a large effective address range ($2^{64}$ bytes). Both address translation mechanisms provide advantages to respective operating systems.

EP690386A1 1996 Jan. 3 "Address translator and method of operation", incorporated herein by reference teaches a CAM/SRAM structure (44) performs address translations that are compatible with a segmentation/paging addressing scheme yet require only a single look-up step. Each entry in the effective-to-real-address-translator has two CAM fields (ESID, EPI) that independently compare an input segment identifier and an input page identifier to a stored segment identifier and a stored page identifier, respectively. The ERAT outputs a stored real address field (DATA) associated with a stored segment-stored page pair if both comparisons are equivalent. The ERAT can invalidate stored translations on the basis of segment or page granularity by requiring either a segment or a page CAM field match, respectively, during an invalidate operation.

U.S. Pat. No. 8,103,851B2 2012 Jan. 24 "Dynamic address translation with translation table entry format control for identifying format of the translation table entry" incorporated herein by reference teaches an enhanced dynamic address translation facility. In one embodiment, a virtual address to be translated and an initial origin address of a translation table of the hierarchy of translation tables are obtained. An index portion of the virtual address is used to reference an entry in the translation table. If a format control field contained in the translation table entry is enabled, the table entry contains a frame address of a large block of data of at least 1M byte in size. The frame address is then combined with an offset portion of the virtual address to form the translated address of a small 4K byte block of data in main storage or memory.

SUMMARY

Embodiments include a method for managing page table entries. The method includes translating, by a processor, a virtual address to locate a first page table entry (PTE) in a page table. The first PTE includes a marker and an address of a page of main storage. It is determined, by the processor, whether a marker is set in the first PTE. A large page size of a large page associated with the first PTE is identified based on determining that the marker is set in the first PTE. The large page is made up of contiguous pages of main storage. An origin address of the large page is determined based on determining that the marker is set in the first PTE. The virtual address is used to index into the large page at the origin address to access main storage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 5A and 5B include an exemplary page table in accordance with an embodiment of the present invention;

FIG. 5C illustrates another exemplary embodiment of a page table;

FIG. 9 includes another exemplary embodiment of a page table;

DETAILED DESCRIPTION

Previous systems have used large page support (e.g., pages greater than 4 kB) to allow more memory to be translated without a translation lookaside buffer (TLB) miss. However, previous systems use direct support from the operating system to use large pages. Such an arrangement may result in problems occurring when different page sizes are used in the system. The embodiments described below allow large pages to be managed directly in the hardware of the system such that the operating system does not need to incorporate management of large pages at the operating system level. Thus, greater utilization of the TLB may be achieved as a given number of TLB entries may translate a larger address space.

In another embodiment, large pages are directly allocated by the operating system, but not representable by the page table formats and sizes. An example of this may be a large page in a radix table, where the large page corresponds to a small-number multiple (and less than a memory region translated by a level in the radix table).

Figure 1:
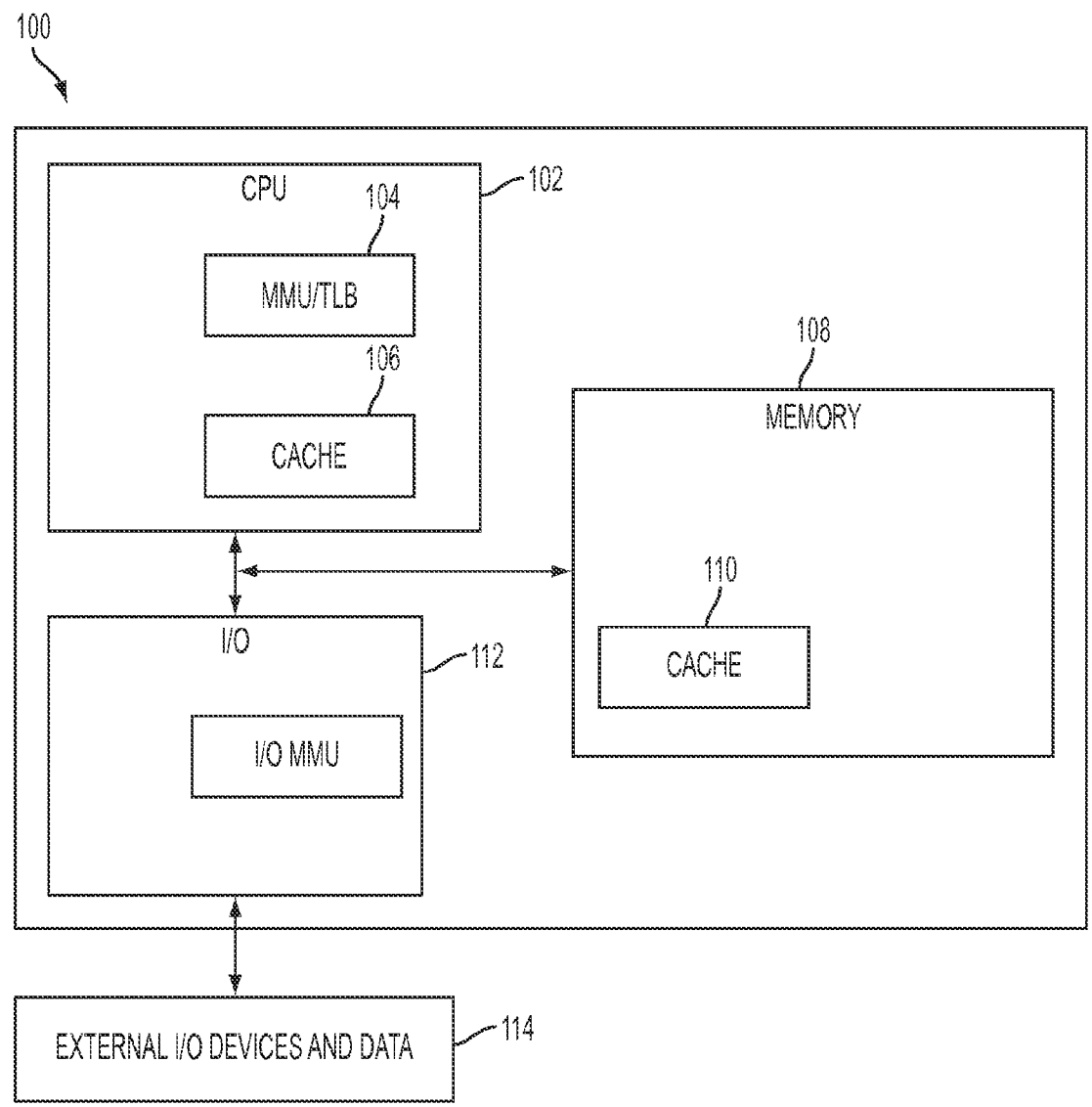
FIG. 1 illustrates a processing system according to an embodiment of the present invention.

Turning now to FIG. 1, an exemplary embodiment of processor system (system) 100, in generally shown. The system 100 includes a processor (CPU) 102 that includes a memory management unit/TLB portion 104 and a cache 106. The processor 102 is communicatively connected to a memory portion 108 having a cache 110 and an input/output (I/O) portion 112. The I/O portion 112 is communicatively connected to external I/O devices 114 that may include, for example, data input devices, sensors, and output devices such as displays.

Figure 2A:
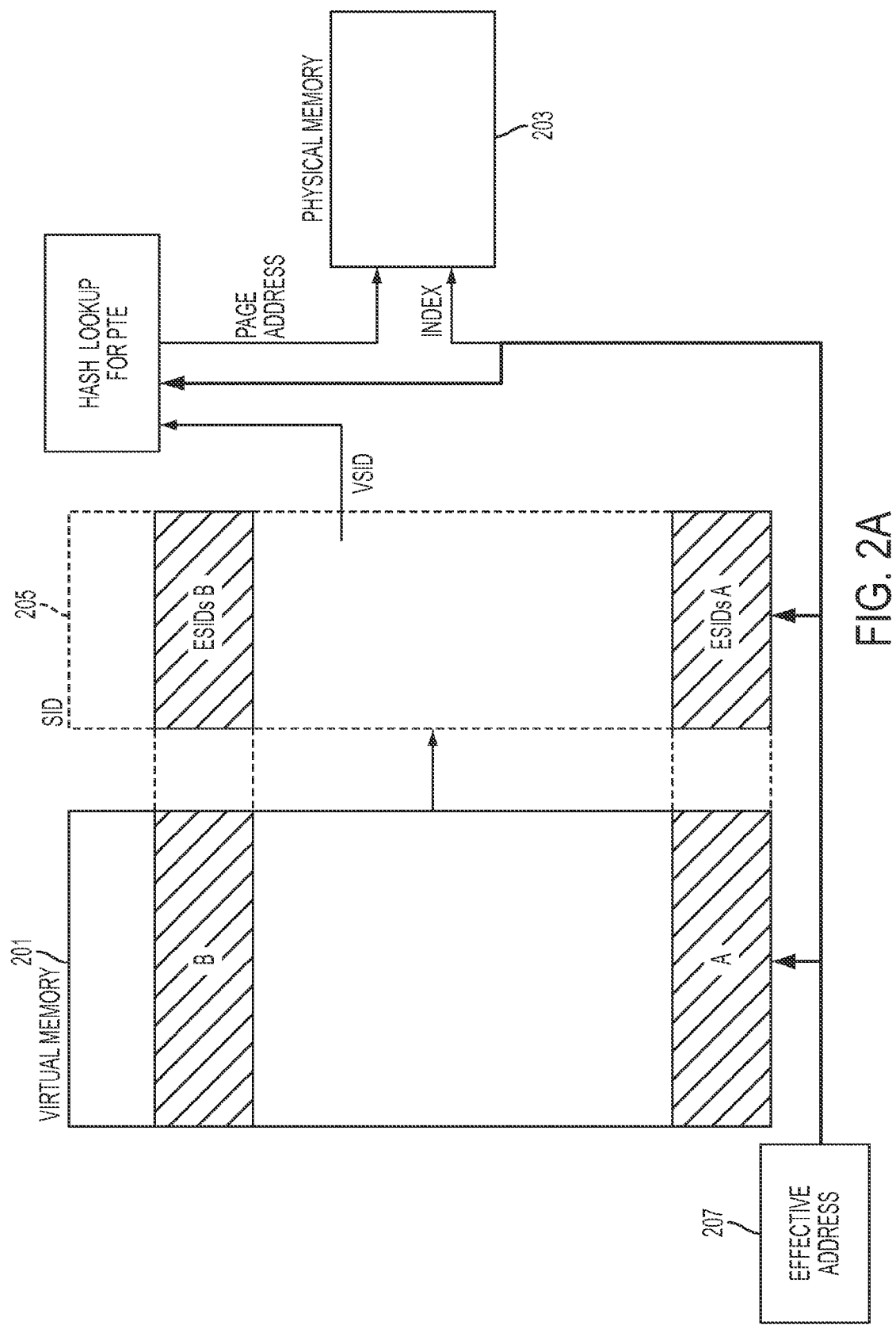
FIG. 2A illustrates an example of a high-level view of a virtual memory (VM) mapped to a physical memory using the Hash PTE (PowerPC) method.

FIG. 2A illustrates an example of a high-level view of a virtual memory (VM) 201 mapped to a physical memory 203 using the Hash page table entry (PTE) method as used by PowerPC for example. In the example, programs only use sections A and B of the VM. All segments of VM are mapped to segment ID (SID) entries identified by effective segment IDs (ESIDs) 205 (ESIDs for B and ESIDs for A included). The "effective address" 207 used by the program selects an SID entry having the ESID value and a virtual segment ID (VSID) value. The VSID value represents the high-order bits of a "virtual address" to be used by a hashing algorithm. A hashed value based on the VSID is used to locate a page table entry (PTE). The page table entry includes an address of a page of physical memory 203.

Figure 2B:
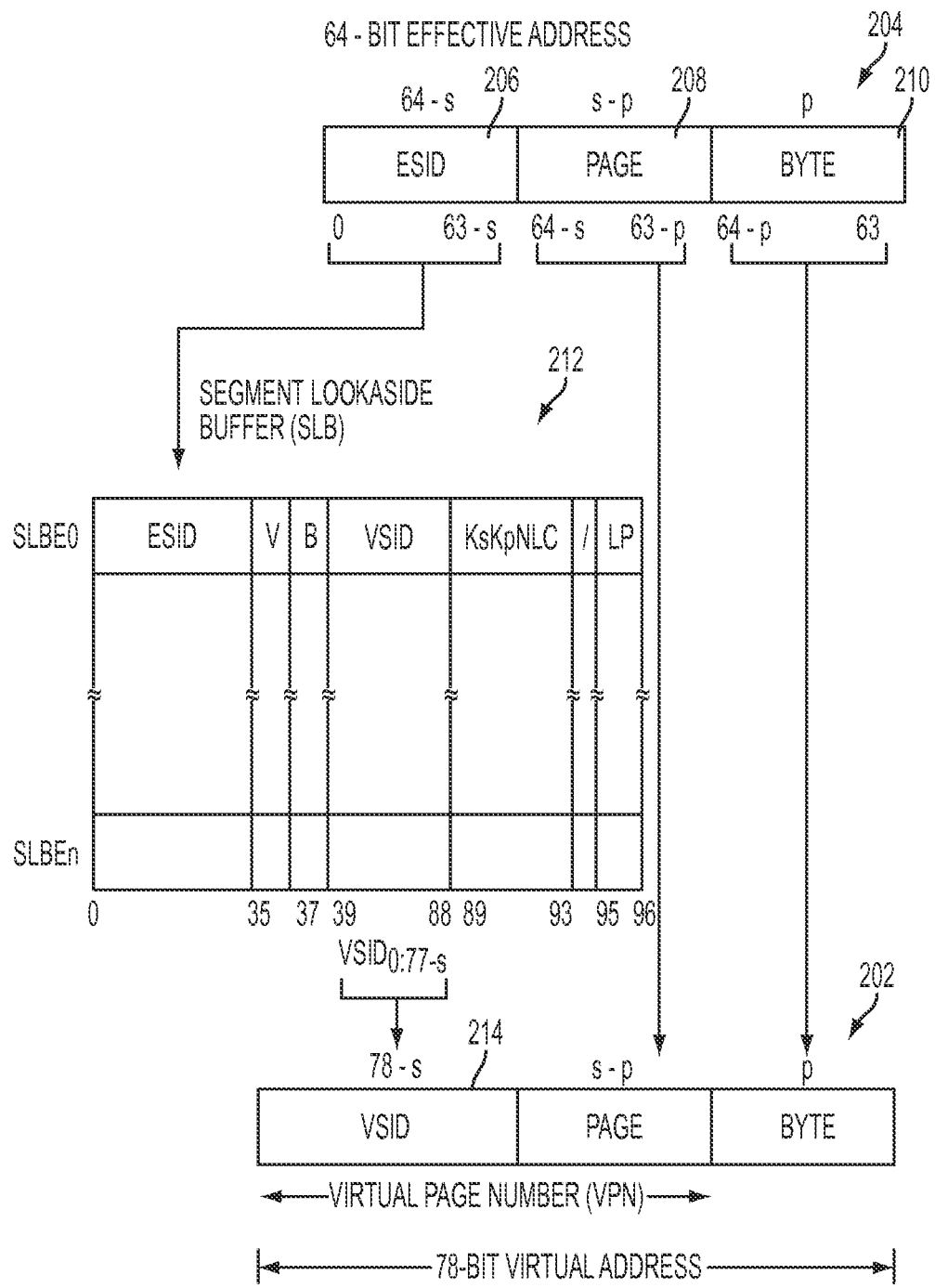
FIG. 2B illustrates an example of a method for generating a virtual address.

FIG. 2B illustrates an example of a method for generating a virtual address 202 for hashing. In this regard, an effective address 204 is received in a memory management unit of a processor that includes effective segment identifier (ESID) field 206, a page field 208 and byte offset (byte field) 210 field. A segment lookaside buffer (SLB) 212 is accessed, and an entry with the ESID 206 of the effective address 204 is located in the SLB 212. The entry with the ESID 206 includes an associated virtual segment identifier (VSID) 214. The associated VSID is used to generate the virtual address 202 that includes the VSID 214 in the SLB 212 associated with the ESID 206 of the effective address 204; and the page 208 and byte 210 from the effective address 204. The virtual address 202 may be used to access physical memory in the memory system. In this disclosure, the terms physical memory, real memory, system memory and absolute memory will be used interchangeably to refer to the main storage, accessible to a processor.

Figure 2C:
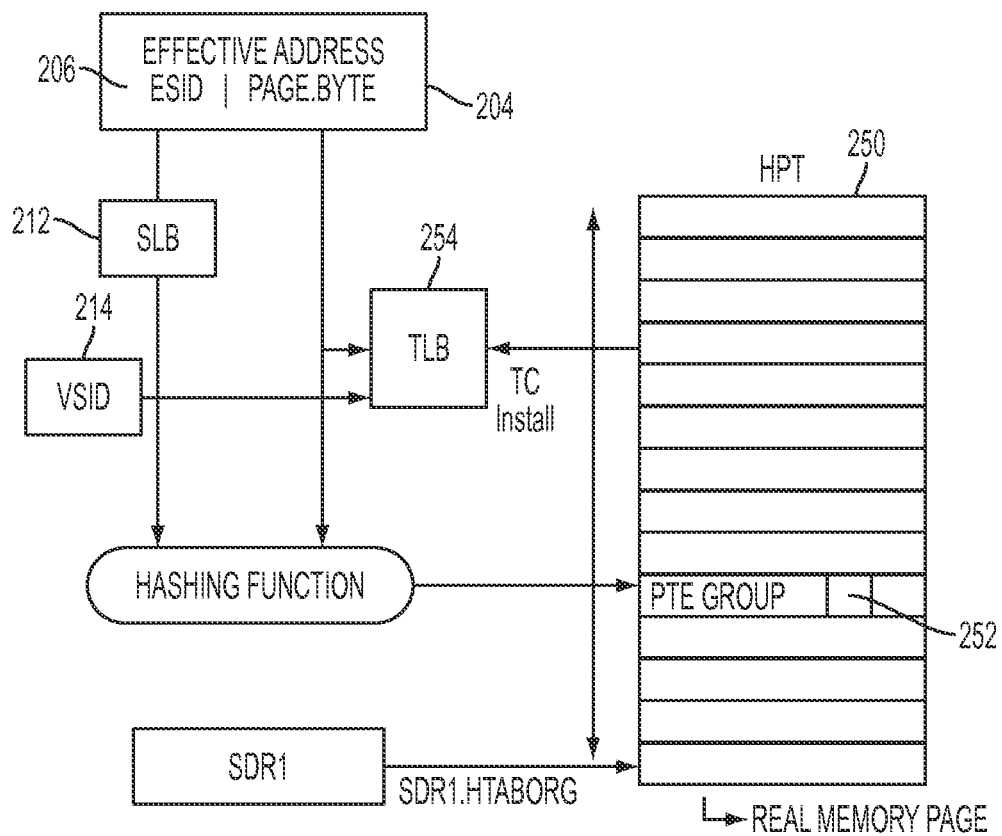
FIG. 2C illustrates an example of a hashed page table (HPT) translation structure used by the Power ISA.

FIG. 2C illustrates an example of a hashed page table (HPT) translation structure used by the PowerPC, Power ISA is further described in detail in the Power ISA™ Version 2.06 Revision B specification incorporated herein by reference. The ESID portion 206 of the effective address (EA) 204 is used to locate an entry in the SLB 212. The entry includes a VSID field 214. The value of the VSID field 214 and a portion of the EA 204 are hashed to produce a hashed value that is used to locate a page table group 252 in the page table (HPT) 250. The PTEs of the group 252 are searched to locate a corresponding PTE having a field matching a value of a most-significant-portion of the VSID. When a corresponding PTE is found, the address of the physical memory page in the PTE is used to access physical memory. In order to improve performance, once a PTE entry is found, the EA 204 portion and address of the physical memory page found in the PTE are stored in the TLB 254, such that further accesses to the same EA page will "hit" in the TLB 254 and avoid the PTE search. The page table is located by a page table origin address provided by the processor.

When a PTE 252 is found in the group that corresponds to the hashed value, the address of the physical memory page in the PTE is used to access physical memory. In order to improve performance, once a PTE entry is found, the EA 204 portion and address of the physical memory page found in the PTE are stored in the TLB 254, such that further accesses to the same EA page will "hit" in the TLB 254 and avoid the PTE search. The page table is located by a page table origin address provided by the processor.

The IBM zArchitecture Principles of Operation SA22-7832-8 and Intel Itanium Architecture Software Developer's Manual Volume 2: System Architecture, Document Number: 245318-005 each incorporated by reference herein include descriptions of other address translation schemes using a hierarchy of translation tables.

Figure 3:
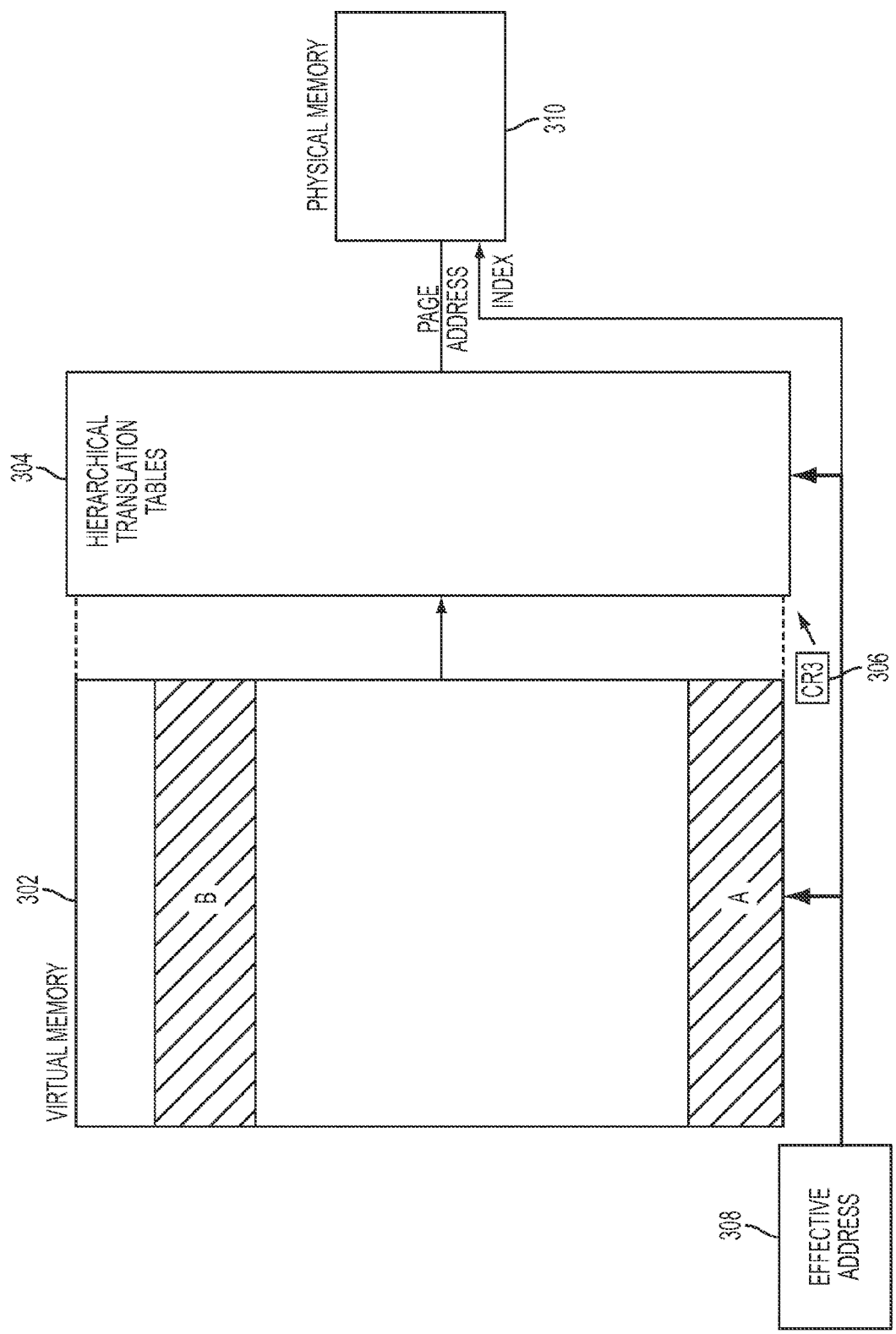
FIG. 3 depicts a Hierarchical translation mechanism.

FIG. 3 depicts an example Hierarchical translation table translation mechanism. In this case, translation tables are provided for translating all of the virtual memory 302, though only regions A and B are to be used. The origin of the highest order translation table of the hierarchical translation tables 304, is provided, for example, by a control register (CR3) 306. The effective address 308 is used to index into each table of the hierarchical translation tables 304 to determine an origin address of the next table to locate, for example, a page table entry (PTE) having an address of a page of physical memory 310.

Figure 4:
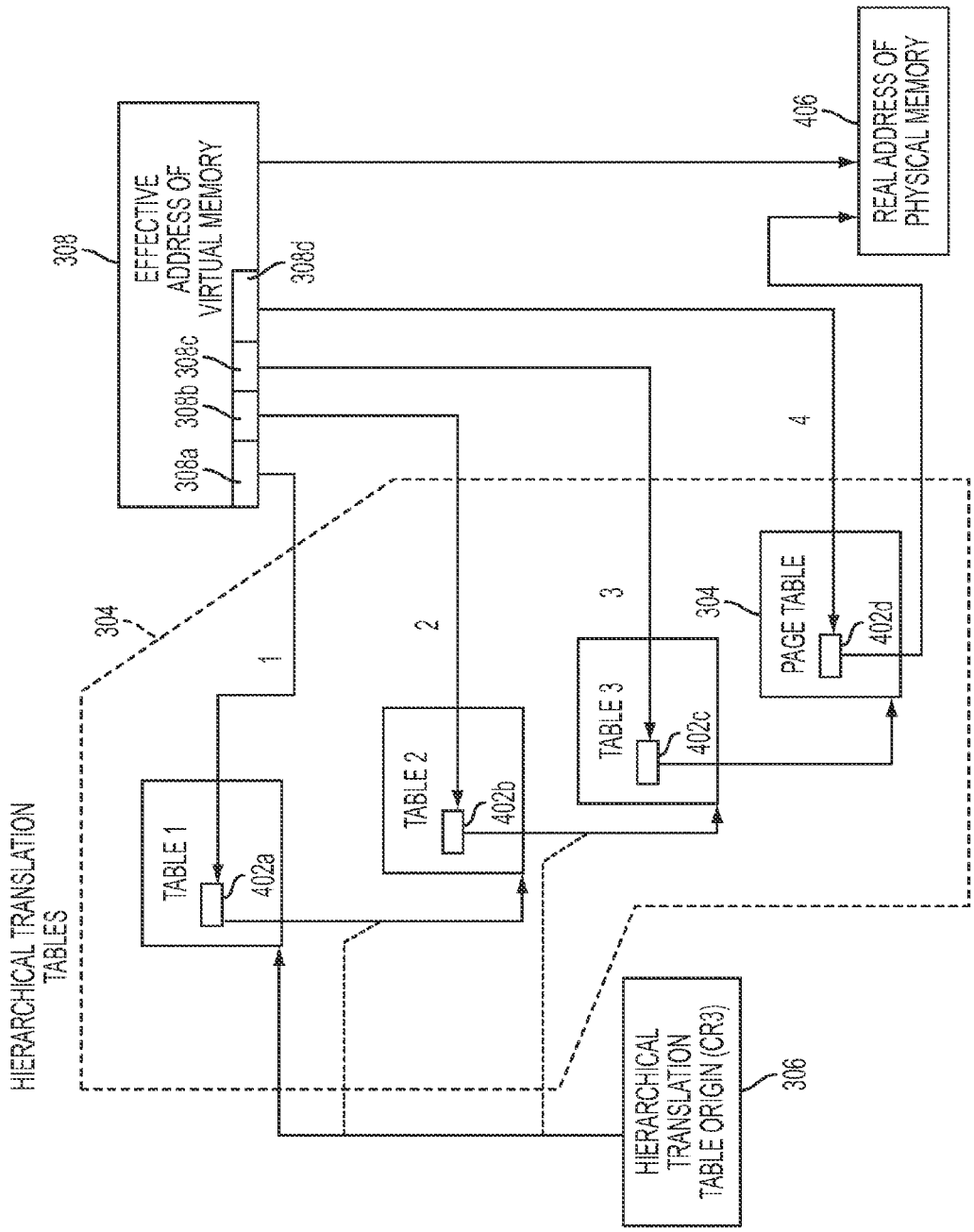
FIG. 4 illustrates an indexing of high level translation tables.

FIG. 4 shows the highest level translation table of the hierarchy is "indexed" by the high portion of the effective address 308a to locate a Table 1 entry 402a that is used to locate the next translation table (Table 2). Similarly a next portion of the effective address 308b is used to index into Table 2 to find a Table 2 entry 402b having the origin address of Table 3. A next portion of the effective address 308c is used to index into Table 3 to find a Table 3 entry 402c having an origin address of a table 304. A next portion of the effective address 308d is used to index into the Table 304 to locate a page table entry 402d having the address of a physical memory page 406. The origin of the hierarchy of translation tables, in an embodiment, may include a table selector field for determining which of said hierarchy of translation tables, the origin applies. Thus, the translation may require only a subset of the hierarchy (wherein an effective address is limited to include a predetermined number of most significant bits having a zero value). A translation using fewer tables will be faster than one using more tables.

FIGS. 5A and 5B include an exemplary embodiment of a page table 501 that has a page table entry number field 502, an effective/virtual address (virtual address) field 504, a physical address field 506, a valid field 508, and a marker field 510. In this regard, the page table entry number field 502 is for illustration purposes as it is a (for the sake of the illustrated example) 9-bit index used to access the array of 512 PTEs (#0-511) in page table 501. The virtual address field 504 is used in a hashed environment and hash discards parts of the virtual address. In a non-hashed environment, the virtual address is implicitly specified by the walk through the radix tree and does not need to be specified in the PTE. (see 308a-d in FIG. 4). The physical address field 506 includes the physical address the operating system has associated with a given virtual address 504. The valid field 508 indicates that the contents for a given PTE found in page table 501 are valid. 510: The marker bit/field 510 will be described in further detail below.

PTEs of FIGS. 5A and 5B may, for example, be used in conjunction with an HPT translation structure (of FIG. 2C). The Intel IA64 architecture is further described in detail in the Intel Itanium Architecture Software Developer's Manual Revision 2.3 incorporated herein by reference. The exemplary operation of the system 100 and the use of the page table 501 will be discussed below. The virtual address field 502 is optional and may be used in a hashed environment.

FIG. 5C illustrates a plurality of page table entries of a page table 304 in accordance with another embodiment in conjunction with the radix tree-based translation of FIG. 4. In accordance with this embodiment, page table entries include a physical address 505, valid bit 507, and page properties bits (marker) 509. In the illustrated embodiment, a page table entry is extended with a marker bit to mark several pages as being part of a virtual address block corresponding to a larger contiguous range of address exceeding the size of a single page. A single hardware translation entry (such as an entry in a TLB, ERAT, or other such translation structure) to translate multiple page table entries, achieving increased hardware translation structure efficiency is used.

Though the illustrated embodiments describe a system using 16 kB blocks having four adjacent entries, alternate embodiments may use any suitable memory arrangement or scheme having blocks of any suitable size and numbers of entries. In an exemplary embodiment, the number of entries is specified by writing to a configuration register (not shown). In another embodiment, a field in the PTE 501 specifies the number of entries. In yet another exemplary embodiment, multiple configuration registers are provided corresponding to multiple radix table levels, establishing multi-entry translation granularity when a higher level directories (such as the page middle directory or the page upper directory) can directly translate larger base page sizes separately for each directory level. If the number of entries is fixed in an implementation as an implementation-specific characteristic in accordance with one exemplary embodiment, a query function may be used to obtain the number of entries in a block.

Figure 6:
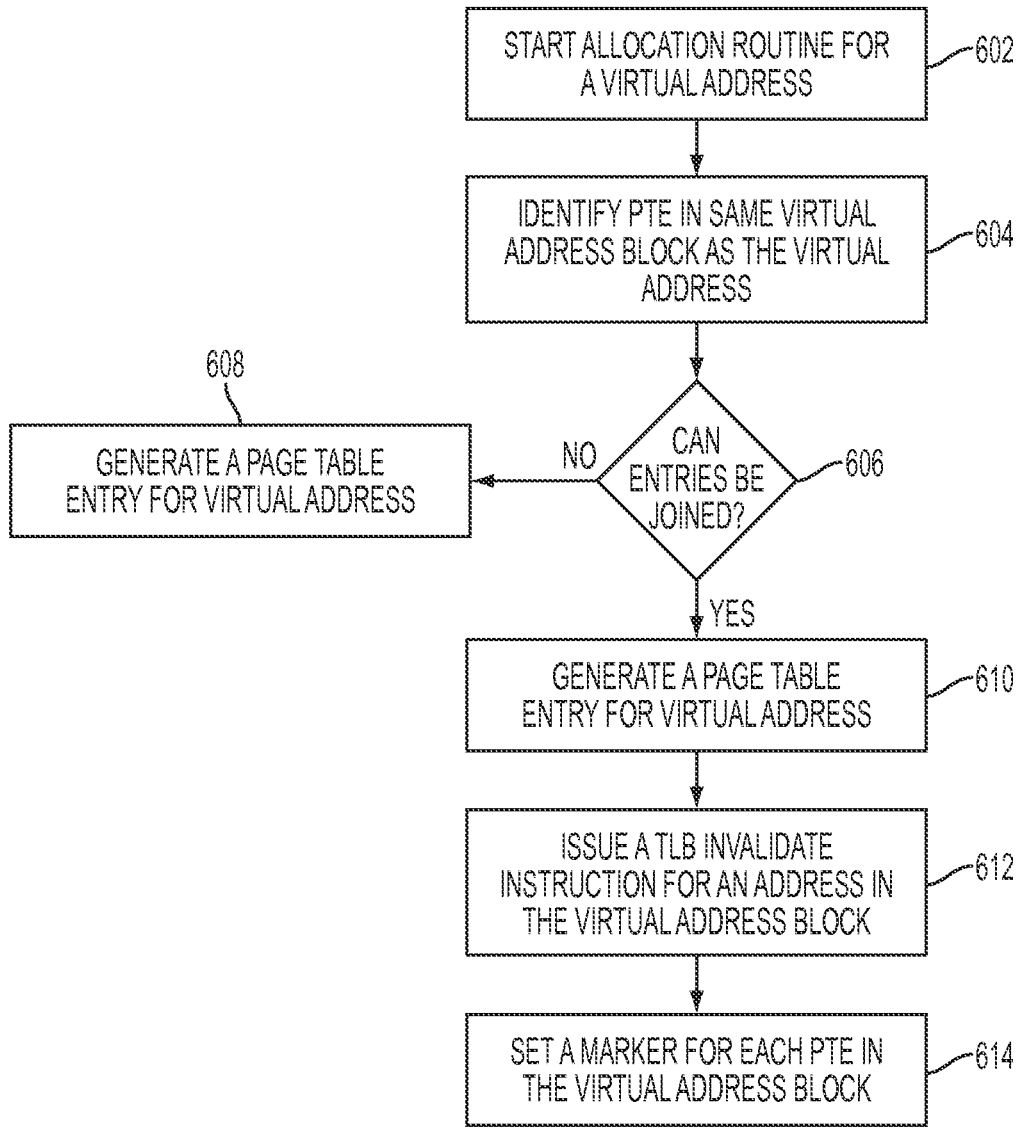
FIG. 6 illustrates a block diagram of an exemplary method for creating entries in the page table of FIG. 5A in accordance with an embodiment of the present invention.

In this regard, FIG. 6 illustrates a block diagram of an exemplary method for creating entries in the page table 501 (of FIG. 5A) for the system 100 (of FIG. 1). Referring to FIG. 6, in block 602, an allocation routine is started for a virtual address. In the illustrated example, the allocation routine will add a mapping for the virtual address 003000 to the physical address 123456780000B000. In block 604, the entries in that same 16 kB virtual address block (entries 0, 1, and 2) as the virtual address 003000 are identified. The physical addresses of the entries are analyzed to determine whether the entries may be joined in block 606. The determination is made by, for example, confirming that the entries 0, 1, and 2 are valid. Each physical address stored in the entries including the physical address that will be installed in entry 3 is logically ANDed with the value 3FFF (16383), which is one byte less than the size of the virtual address block (for a 16 kB virtual address block). The result from each PTE is 1234567800008000. If the result is the same from each PTE, then the four PTEs may be joined. If no, a page table entry is created for the virtual address 003000. In the illustrated example, the page table entries in the virtual address block may be joined. Thus, in block 610, a page table entry for the virtual address 003000 is generated mapping to the physical address 123456780000B000. TLB invalidate instructions are issued to invalidate all valid TLB entries spanning the virtual addresses contained in the virtual address block in block 612. In block 614, a marker in the marker field 510 is set for each PTE in the virtual address block. FIG. 5B illustrates an exemplary embodiment of the resultant page table 501 following the performance of the method described above. If the hardware translation lookup is not successful, the operating system may start an allocation routine for a virtual address.

A TLB has a fixed number of slots that contain page table entries, which map virtual addresses to physical addresses. The virtual memory is the space seen from a process. This space is segmented in pages of a prefixed size. The page table (generally loaded in memory) keeps track of where the virtual pages are loaded in the physical memory. The TLB is a cache of the page table; that is, only a subset of its content is stored.

The TLB references physical memory addresses in its table. It may reside between the CPU and the CPU cache, between the CPU cache and primary storage memory, or between levels of a multi-level cache. The placement determines whether the cache uses physical or virtual addressing. If the cache is virtually addressed, requests are sent directly from the CPU to the cache, and the TLB is accessed only on a cache miss. If the cache is physically addressed, the CPU does a TLB lookup on every memory operation and the resulting physical address is sent to the cache. There are pros and cons to both implementations. Caches that use virtual addressing have for their key part of the virtual address plus, optionally, a key called an "address space identifier" (ASID). Caches that do not have ASIDs must be flushed every context switch in a multiprocessing environment.

In a Harvard architecture or hybrid thereof, a separate virtual address space or memory access hardware may exist for instructions and data. This can lead to distinct TLBs for each access type.

Figure 7:
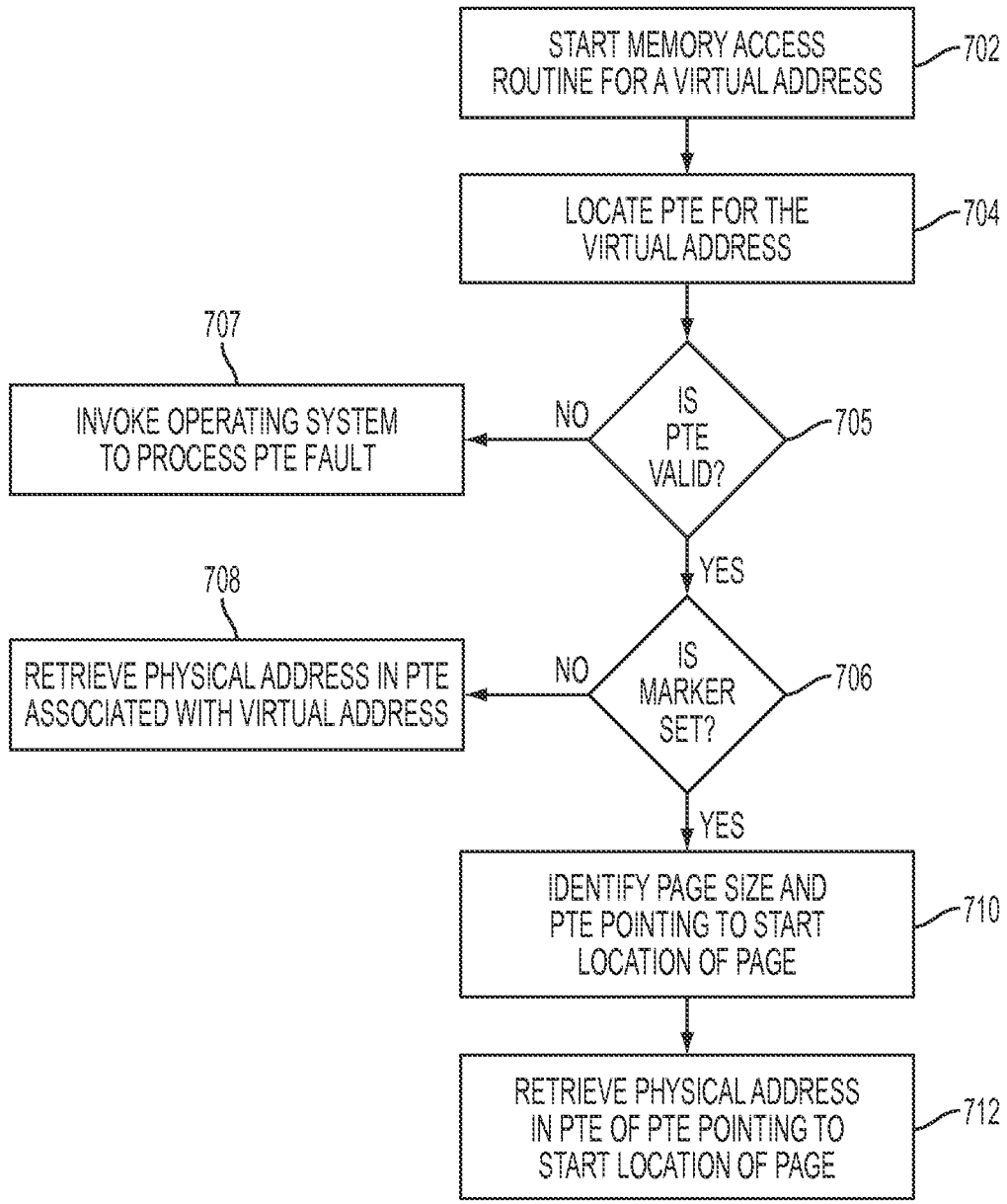
FIG. 7 illustrates block diagram of an exemplary method for accessing a memory location using the page table of FIG. 5B in accordance with an embodiment of the present invention.

FIG. 7 illustrates a block diagram of an exemplary method for accessing a memory location using the page table 501 (of FIG. 5B). In this regard, referring to FIG. 7, in block 702, a memory access routine is started to access the memory location 001000. In block 704, the PTE for 001000 is located and read. In block 705, the system 100 determines whether the PTE is valid. If no, the operating system is invoked to process a PTE fault in block 707. The system 100 determines whether a marker is set in the marker field 510 (of FIG. 5B) in block 706. If no, the physical address is retrieved from the PTE associated with the virtual address in block 708, and the physical address may be used to access the memory location by the processor. If the marker is set, in block 710, the page size is determined (in a similar manner as discussed above), and the start location of the page is sent to the processor for accessing the memory location. The start location of the page is identified when the marker is set in the PTE by performing an AND operation with the virtual and physical address in the PTE with the one's complement of one less than the size of the 16 kB virtual address block to obtain a virtual-address-block virtual and physical address to be mapped. (16384−1=16383=3FFF) The one's complement is FFFFFFFFFFFFC000, which is then ANDed with the virtual and physical addresses. In block 712, the physical address is retrieved (e.g., 000000 pointing to 16 kB block at 123457800009000) for the PTE pointing to the start location of the page. The virtual-address-block virtual and physical addresses are installed in a hardware translation entry, in conjunction with page table attributes stored in a PTE in accordance with FIG. 5C.

Those skilled in the art will understand that when a virtual-address-block is translated by a single hardware entry, attributes for all addresses mapped by a single hardware translation entry are consistent.

In one aspect of an embodiment, method of FIG. 7 is augmented to check for equivalence. In another embodiment, FIG. 7 is applied to pages of like translation properties (e.g., to pages containing instructions relative to other pages containing instructions, or pages containing to normal application data mapped in cacheable and writable manner relative to other normal application data mapped in cacheable and writable manner, or to read-only data relative to other read-only data, and so forth.)

In one aspect, no hardware check is performed to ensure consistent page properties. In another aspect, hardware checks all marked page PTEs prior to installing a virtual-address-block for compatible attributes. If said check fails, in one embodiment, a virtual-address-block translation is not installed as an entry. In one aspect, a software error notification is raised (e.g., by way of an exception reported to one of an operating system and a hypervisor). In another aspect, a hardware translation entry is installed corresponding to a single PTE is installed and the marker is ignored.

Those skilled in the art will understand that when multiple PTEs are used to map a range of a virtual-address-block that virtual and physical addresses will be contiguous.

In one aspect, no hardware check is performed to ensure contiguous physical addresses are being mapped by PTEs marked as members of a virtual-address-block.

In another aspect, hardware checks all marked page PTEs prior to installing a virtual-address-block for contiguous physical addresses. If said check fails, in one embodiment, a virtual-address-block translation is not installed as an entry. In one aspect, a software error notification is raised (e.g., by way of an exception reported to one of an operating system and a hypervisor). In another aspect, a hardware translation entry is installed corresponding to a single PTE is installed and the marker is ignored.

Figure 8:
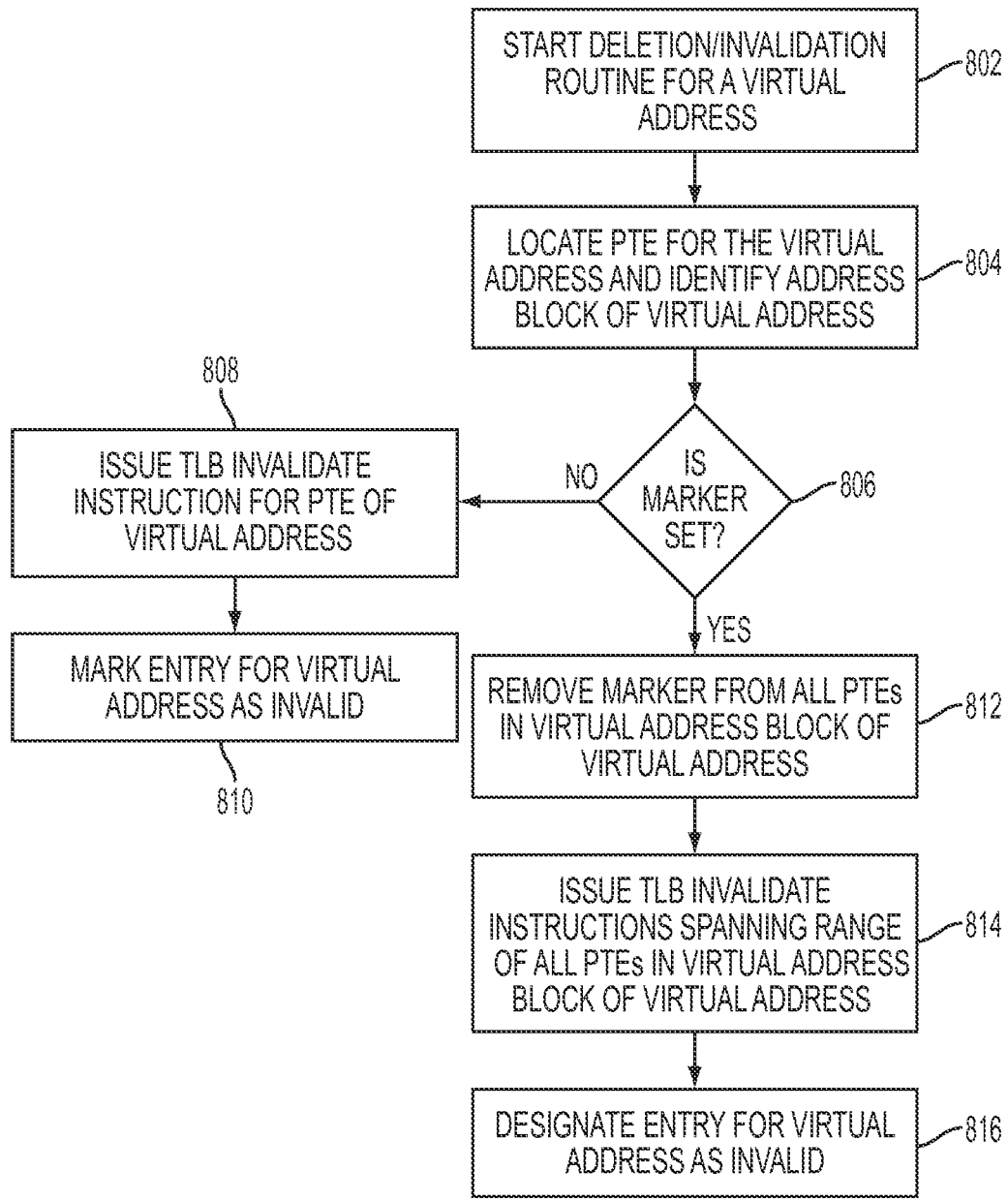
FIG. 8 illustrates block diagram of an exemplary method for deleting or invalidating a PTE using the page table of FIG. 5B in accordance with an embodiment of the present invention.

FIG. 8 illustrates block diagram of an exemplary method for deleting or invalidating a PTE using the page table 501 (of FIG. 5B). In this regard, referring to FIG. 8, in block 802, a deletion/invalidation routine that is operative to remove a translation from the page table 501 for the virtual address 002000 is started. The PTE for the virtual address and the associated address block is located in block 804. If a marker in the marker field 510 is not set in block 806, in block 808, the system issues a TLB invalidate instruction for the PTE with the virtual address. In block 810, the PTE for the virtual address is marked invalid in the valid field 508 (of FIG. 5B). If the marker in the marker field 510 is set, in block 812, the marker in the marker field 510 is removed for all PTEs in the virtual address block of the virtual address (e.g., 0, 1, and 3, following an identification of the PTEs in the virtual address block of the virtual address (e.g., 0, 1, 2, 3). Once the markers are removed, TLB invalidate instructions are issued for all PTEs in the virtual address block of the virtual address in block 814. The PTE of the virtual address (002000) is marked invalid in the valid field 508 in block 816.

FIG. 9 includes another exemplary embodiment of a page table 901 that has a page table entry number field 902, an effective/virtual address (virtual address) field 904, a physical address field 906, a valid field 908, and a marker field 910, and a remaining function bits field 912. The exemplary operation of the system 100 (of FIG. 1) and the use of the page table 901 will be discussed below.

In the page table 901, the marker fields 910 of the PTEs 0 and 1 are set, which indicates that the virtual address block is an 8 kB block. The set indication of the PTEs 0 and 1 indicates to the system 100 that the PTEs 0 and 1 should be accessed as larger PTEs, and the fields indicated by the "###" (fields 906b and 912b) are available to store additional data or information. In one embodiment, additional page properties are stored in the additional bits of such a PTE. In another embodiment, additional physical address bits may be stored in these additional bits of such a PTE, allowing the system to address physical addresses not otherwise accessible. In one aspect of the embodiment, this can be used to map an extended memory region using large pages that is not addressable by physical addresses that can be stored in a normal PTE. The set indication of the PTEs 0 and 1 along with the valid indications in the valid field 908 also indicates to the system that both PTEs 0 and 1 should be read when a memory access routine is performed.

Figure 10:
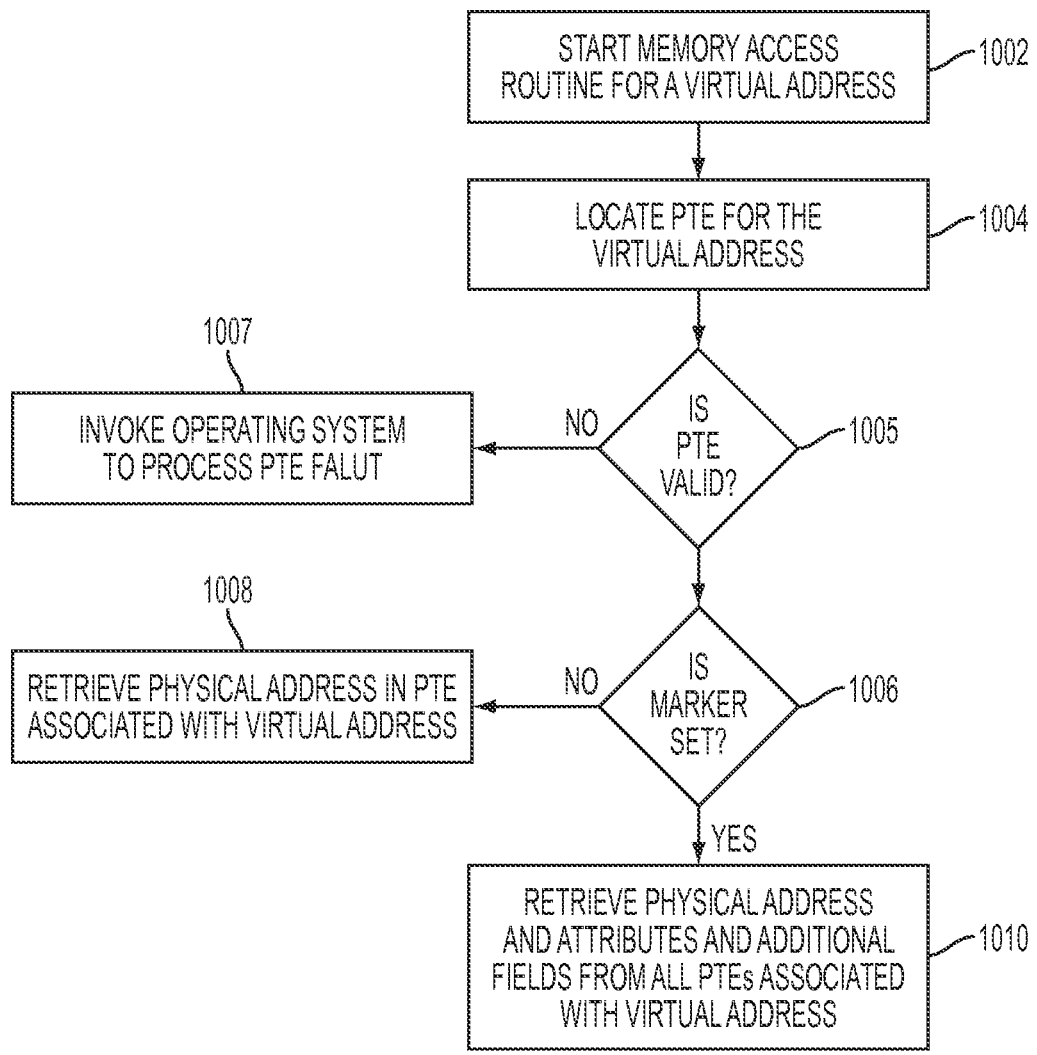
FIG. 10 illustrates block diagram of an exemplary method for accessing a memory location using the page table of FIG. 9.

FIG. 10 illustrates block diagram of an exemplary method for accessing a memory location using the page table 701 (of FIG. 7). In this regard, referring to FIG. 10, in block 1002, a memory access routine is started to access the memory location 001000. In block 1004, the PTE for 001000 is located and read. In block 1005, the system 100 determines whether the PTE is valid. If no, the operating system is invoked to process a PTE fault in block 1007. The system 100 determines whether a marker is set in the marker field 910 (of FIG. 9) in block 1006. If no, the physical address is retrieved from the PTE associated with the virtual address in block 1008, and the physical address is sent to the processor to access the memory location. If the marker is set, in block 1010, the physical address and attributes and the remaining function bits are retrieved from all PTEs associated with the virtual address and sent to the processor to access the memory location. Though the illustrated embodiments describe a system using 8 kB blocks having two adjacent entries, alternate embodiments may use any suitable memory arrangement or scheme having blocks of any suitable size and numbers of entries. In an exemplary embodiment, the number of entries is specified by writing to a configuration register (not shown). In another embodiment, a field in the PTE 901 specifies the number of entries.

While the embodiments herein have been described as substituting multiple adjacent separate PTEs with PTEs marked as members of a virtual-address-block responsive to detecting that multiple entries are adjacent in virtual and physical memory spaces, and hence being able to be translated by a common hardware translation entry, it is contemplated that in at least one embodiment, and operating system uses memory allocation pools corresponding to virtual-address-blocks. In accordance with such an embodiment, the operating system allocates a virtual-address-block responsive to memory needs by software running on a system. When a virtual address block is allocated, the operating system immediately installs a plurality of page table entries PTEs which are marked as members of a virtual-address-block.

Figure 11:
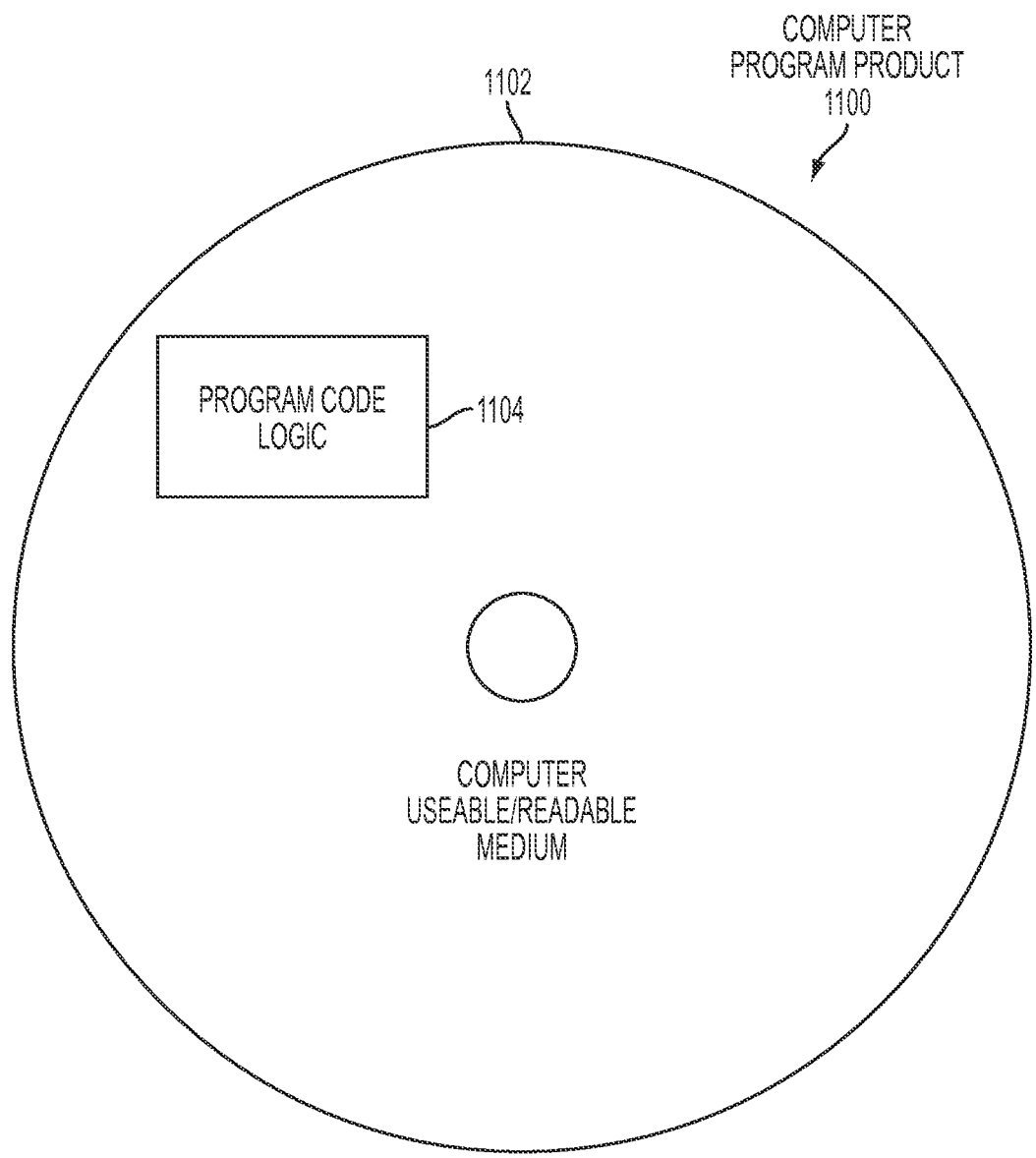
FIG. 11 illustrates an exemplary embodiment of a computer program product.

FIG. 11 illustrates an exemplary embodiment of a computer program product 1100 that includes a computer usable/readable medium 1102 with program code logic 1104 written therein.

The technical effects and benefits of the methods and systems described above allow large pages to be managed directly in the hardware of the system such that the operating system does not need to incorporate management of large pages at the operating system level. Thus, greater utilization of the TLB may be achieved as a given number of TLB entries may translate a larger address space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for accessing memory locations, the method comprising:
    translating, by a processor, a virtual address to locate a first page table entry (PTE) in a page table, the first PTE comprising a marker and an address of a page of main storage, wherein the first PTE points to a first page;
    determining, with the processor, whether the marker is set in the first PTE;
    identifying a large page size of a large page associated with the first PTE based on determining that the marker is set in the first PTE, wherein the large page consists of contiguous pages of main storage and the identifying includes determining the large page size based on content of a configuration register;
    determining a second PTE that is distinct from the first PTE, that points to a second page that is contiguous to the first page, and that comprises a start location of the large page based on determining that the marker is set in the first PTE, wherein the large page comprises the first page and the second page;
    obtaining the start location from the second PTE; and
    using the virtual address to index into the page table at the start location to access the large page in main storage.

2. The method of claim 1, wherein a range of virtual addresses identify corresponding PTEs comprising said first PTE, wherein each PTE of said corresponding PTEs is configured to address a respective page of main storage, each of said pages of main storage being contiguous.

3. The method of claim 1, wherein the method further comprises:
    storing virtual address information and an address for locating said large page, in a translation look-aside buffer (TLB); and
    using the TLB to translate virtual addresses to large pages.

4. The method of claim 1, wherein the determining the large page size is further based on marker bits in a plurality of contiguous PTEs associated with a corresponding block of virtual addresses on a block boundary.

5. The method of claim 1, wherein each of a plurality of PTEs corresponding to the large page comprises a respective address of a corresponding respective page of main storage, and wherein the respective pages of each of the plurality of PTEs are contiguous.

6. The method of claim 1, wherein the method further comprises:
    identifying a single page associated with the first PTE based on determining that the marker is not set in the first PTE; and
    using the virtual address to index into the page table to access main storage.

7. The method of claim 1, wherein the translating comprises at least one of using a hierarchical set of translation tables to locate the PTE and using a hashing function to locate a group of PTEs, the group of page table entries comprising the PTE corresponding to the virtual address.

8. The method of claim 1, wherein the determining the start location of the large page includes performing a logic operation that includes the large page size, the address of the page of main storage, and the virtual address as inputs.

9. The method of claim 1, wherein the second PTE comprises a first physical address field that stores the start location of the large page, and wherein the first PTE comprises a second physical address field that stores additional page properties of the large page comprising the first page and the second page, and wherein the start location in the first physical address field is a different value from the additional page properties in the second physical address field.

* * * * *